(12) United States Patent
Winkle et al.

(10) Patent No.: US 10,474,982 B2
(45) Date of Patent: Nov. 12, 2019

(54) SYSTEMS AND METHODS UTILIZING NANOTECHNOLOGY INSULATION MATERIALS IN LIMITING TEMPERATURE CHANGES DURING PRODUCT DELIVERY

(71) Applicant: Walmart Apollo, LLC, Bentonville, AR (US)

(72) Inventors: David C. Winkle, Bella Vista, AR (US); Brian G. McHale, Chadderton Oldham (GB); Donald R. High, Noel, MO (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 104 days.

(21) Appl. No.: 15/724,583

(22) Filed: Oct. 4, 2017

(65) Prior Publication Data

US 2018/0096294 A1 Apr. 5, 2018

Related U.S. Application Data

(60) Provisional application No. 62/403,909, filed on Oct. 4, 2016.

(51) Int. Cl.
*B64C 39/00* (2006.01)
*G06Q 10/08* (2012.01)
(Continued)

(52) U.S. Cl.
CPC ....... *G06Q 10/0832* (2013.01); *B64C 39/024* (2013.01); *B65D 81/18* (2013.01);
(Continued)

(58) Field of Classification Search
None
See application file for complete search history.

(56) References Cited

U.S. PATENT DOCUMENTS 2,477,932 A 8/1949 King
3,450,196 A 6/1969 Bauer
(Continued)

FOREIGN PATENT DOCUMENTS

CA 2117944 8/1998
CN 1810583 8/2006
(Continued)

OTHER PUBLICATIONS

U.S. Appl. No. 15/598,699, filed May 18, 2017, David C. Winkle.
(Continued)

*Primary Examiner* — Truc M Do
(74) *Attorney, Agent, or Firm* — Fitch, Even, Tabin & Flannery LLP

(57) ABSTRACT

In some embodiments, systems and methods are provided that limit the change in temperature and/or control a temperature of a product during delivery. Some embodiments provide systems comprising an unmanned delivery vehicle (UDV) comprising: a body comprising a nanotechnology insulation material, wherein the nanotechnology insulation material comprises material having been manipulated at a molecular level during the macroscale fabrication of the nanotechnology insulation material to enhance insulation effectiveness; at least one propulsion system; a control circuit coupled with the at least one propulsion system to control the operation of the at least one propulsion system and control a direction of travel of the UDV, wherein the body physically supports the propulsion system and the control circuit; and a product cavity defined within the body and configured to receive at least one product while the at least one product is transported by the UDV to a delivery location.

14 Claims, 3 Drawing Sheets

(51) Int. Cl.
*B64C 39/02* (2006.01)
*B65D 81/18* (2006.01)
*B65D 81/38* (2006.01)
*B82Y 30/00* (2011.01)
*G08G 5/00* (2006.01)

(52) U.S. Cl.
CPC .... *B65D 81/3823* (2013.01); *B64C 2201/027* (2013.01); *B64C 2201/108* (2013.01); *B64C 2201/128* (2013.01); *B64C 2201/141* (2013.01); *B64C 2201/165* (2013.01); *B82Y 30/00* (2013.01); *G08G 5/0069* (2013.01)

(56) References Cited

U.S. PATENT DOCUMENTS

| | | |
|---|---|---|
| 3,726,106 A | 4/1973 | Jaeger |
| 3,831,389 A | 8/1974 | Lipona |
| 3,961,925 A | 6/1976 | Rhoad |
| 4,462,461 A | 7/1984 | Grant |
| 4,823,554 A | 4/1989 | Trachtenberg |
| 4,936,100 A | 6/1990 | Leppa |
| 5,290,580 A | 3/1994 | Floyd |
| 5,337,579 A | 8/1994 | Saia, III |
| 5,669,233 A | 9/1997 | Cook |
| 5,813,454 A | 9/1998 | Potter |
| 5,826,432 A | 10/1998 | Ledbetter |
| 5,908,649 A | 6/1999 | Floyd |
| 6,003,322 A | 12/1999 | Graham |
| 6,029,457 A | 2/2000 | Neeser |
| 6,209,343 B1 | 4/2001 | Owen |
| 6,244,458 B1 | 6/2001 | Frysinger |
| 6,336,340 B1 | 1/2002 | Laby |
| 6,382,141 B1 | 5/2002 | Maynor |
| 6,390,378 B1 | 5/2002 | Briscoe |
| 6,412,287 B1 | 7/2002 | Hughes |
| 6,427,475 B1 | 8/2002 | Defelice |
| 6,536,189 B1 | 3/2003 | Murray |
| 6,551,182 B2 | 4/2003 | Caracciolo |
| 6,555,789 B2 | 4/2003 | Owens |
| 6,584,797 B1 | 7/2003 | Smith |
| 6,732,534 B2 | 5/2004 | Spry |
| 6,763,666 B2 | 7/2004 | Fong |
| 6,789,391 B2 | 9/2004 | Graham |
| 6,817,202 B1 | 11/2004 | Anthony |
| 6,968,711 B2 | 11/2005 | Smith |
| 7,073,338 B2 | 7/2006 | Harwood |
| 7,130,771 B2 | 10/2006 | Aghassipour |
| 7,310,967 B2 | 12/2007 | Aragon |
| 7,407,065 B2 | 8/2008 | Hooks |
| 7,650,757 B2 | 1/2010 | Bhatti |
| 7,784,301 B2 | 8/2010 | Sasaki |
| 7,849,708 B2 | 12/2010 | Goncharko |
| 7,913,511 B2 | 3/2011 | Meyer |
| 8,151,599 B2 | 4/2012 | Sixt |
| 8,375,730 B2 | 2/2013 | Haarmann |
| 8,600,903 B2 | 12/2013 | Eller |
| 8,783,002 B2 | 7/2014 | Bowden |
| 8,881,540 B1 | 11/2014 | Barakat |
| 8,905,744 B2 | 12/2014 | Fruth |
| 8,948,935 B1* | 2/2015 | Peeters ............... B64C 39/024 701/3 |
| 9,163,863 B1 | 10/2015 | Armstrong |
| 9,290,313 B2 | 3/2016 | De Lesseux |
| 9,310,279 B2 | 4/2016 | Crombie |
| 9,536,216 B1* | 1/2017 | Lisso ............... G06Q 10/0832 |
| 10,005,609 B1* | 6/2018 | Biene ............... B65D 81/38 |
| 10,040,552 B2* | 8/2018 | Gordon ............... B64C 39/024 |
| 10,071,804 B1* | 9/2018 | Buchmueller ........ B64D 1/08 |
| 10,169,735 B2* | 1/2019 | Lund ............... B64C 39/024 |
| 10,207,804 B1* | 2/2019 | Gentry ............... B64D 9/00 |
| 2002/0040586 A1 | 4/2002 | Glenk |
| 2003/0014993 A1 | 1/2003 | Smith |
| 2003/0163225 A1 | 8/2003 | Hanson |
| 2004/0226309 A1 | 11/2004 | Broussard |
| 2004/0243353 A1 | 12/2004 | Aghassipour |
| 2005/0029149 A1 | 2/2005 | Leung |
| 2005/0091988 A1* | 5/2005 | Stewart ............... B60P 3/007 62/3.1 |
| 2006/0208881 A1 | 9/2006 | Suzuki |
| 2007/0018791 A1 | 1/2007 | Johnson |
| 2007/0193297 A1 | 8/2007 | Wilson |
| 2008/0060376 A1 | 3/2008 | Espinosa |
| 2008/0128095 A1 | 6/2008 | Van Zutven |
| 2008/0242752 A1 | 10/2008 | Delaviz |
| 2008/0260303 A1 | 10/2008 | De Lesseux |
| 2008/0282705 A1 | 11/2008 | Hue |
| 2008/0291033 A1 | 11/2008 | Aghassipour |
| 2008/0308452 A1 | 12/2008 | Eller |
| 2009/0049845 A1* | 2/2009 | McStravick ............ F25B 21/02 62/3.62 |
| 2009/0228155 A1 | 9/2009 | Slifkin |
| 2009/0288438 A1 | 11/2009 | Viegas |
| 2010/0047546 A1 | 2/2010 | Malshe |
| 2010/0064698 A1 | 3/2010 | Schabron |
| 2010/0251731 A1 | 10/2010 | Bergida |
| 2011/0084162 A1* | 4/2011 | Goossen ............... B64C 39/024 244/12.1 |
| 2011/0186591 A1 | 8/2011 | Pfister |
| 2011/0221573 A1 | 9/2011 | Huat |
| 2012/0111044 A1 | 5/2012 | Chen |
| 2012/0210677 A1 | 8/2012 | Proskin |
| 2012/0227856 A1 | 9/2012 | Sinacori |
| 2013/0008909 A1* | 1/2013 | Terracciano ............ A47J 39/02 220/592.2 |
| 2013/0020309 A1 | 1/2013 | Tattam |
| 2013/0045870 A1 | 2/2013 | Rogers |
| 2013/0048264 A1* | 2/2013 | Lu ............... G05D 23/00 165/287 |
| 2013/0073477 A1 | 3/2013 | Grinberg |
| 2013/0091873 A1 | 4/2013 | Surendra |
| 2013/0111937 A1 | 5/2013 | Hendrix |
| 2013/0333396 A1 | 12/2013 | Handley |
| 2014/0032034 A1* | 1/2014 | Raptopoulos ........ G08G 5/0069 701/25 |
| 2014/0144161 A1 | 5/2014 | Pointer |
| 2014/0157794 A1 | 6/2014 | McGann |
| 2014/0157797 A1 | 6/2014 | Kovalick |
| 2014/0216101 A1 | 8/2014 | Dubreuil |
| 2014/0305147 A1 | 10/2014 | Goux |
| 2015/0006005 A1 | 1/2015 | Yu |
| 2015/0120094 A1* | 4/2015 | Kimchi ............... B64C 39/024 701/3 |
| 2015/0120597 A1 | 4/2015 | Dertadian |
| 2015/0158392 A1 | 6/2015 | Zhao |
| 2015/0183528 A1* | 7/2015 | Walsh ............... B64F 1/32 701/3 |
| 2015/0192475 A1 | 7/2015 | Eisenstadt |
| 2015/0291868 A1 | 10/2015 | Rajagopalan |
| 2015/0316309 A1 | 11/2015 | Reitz |
| 2016/0016664 A1* | 1/2016 | Basuni ............... B64C 39/024 244/17.13 |
| 2016/0084577 A1 | 3/2016 | Chou |
| 2016/0107750 A1 | 4/2016 | Yates |
| 2016/0124435 A1 | 5/2016 | Thompson |
| 2016/0159496 A1 | 6/2016 | O'Toole |
| 2016/0183730 A1* | 6/2016 | Bedi ............... A47G 19/2288 219/439 |
| 2016/0235236 A1* | 8/2016 | Byers ............... A47G 29/14 |
| 2016/0265796 A1 | 9/2016 | Carbone |
| 2017/0203857 A1 | 7/2017 | O'Toole |
| 2017/0336125 A1 | 11/2017 | Winkle |
| 2017/0336126 A1 | 11/2017 | Winkle |
| 2017/0351999 A1 | 12/2017 | Winkle |
| 2017/0363349 A1 | 12/2017 | McHale |
| 2018/0031296 A1 | 2/2018 | Winkle |
| 2019/0145689 A1 | 5/2019 | Winkle |
| 2019/0170423 A1 | 6/2019 | Winkle |

FOREIGN PATENT DOCUMENTS

| | | |
|---|---|---|
| CN | 201429291 Y | 3/2010 |
| CN | 202345497 | 7/2012 |

(56) References Cited

FOREIGN PATENT DOCUMENTS

| | | |
|---|---|---|
| CN | 103723001 | 4/2014 |
| CN | 203699065 | 7/2014 |
| DE | 4134322 A1 | 4/1993 |
| EP | 1387135 A2 | 2/2004 |
| EP | 2006620 A2 | 12/2008 |
| EP | 2604956 | 6/2013 |
| EP | 2614729 | 7/2013 |
| EP | 2158814 | 8/2013 |
| GB | 1198354 | 7/1970 |
| JP | H07243741 A | 9/1995 |
| KR | 101555684 B1 | 10/2015 |
| WO | 98031608 | 7/1998 |
| WO | 1999064818 | 12/1999 |
| WO | 0108983 | 2/2001 |
| WO | 03013318 | 4/2003 |
| WO | 2006072210 | 7/2006 |
| WO | 2006124149 | 4/2008 |
| WO | 2010044107 | 4/2010 |
| WO | 2011061431 | 5/2011 |
| WO | 2013063374 | 5/2013 |
| WO | 2017201118 | 11/2017 |
| WO | 2017201230 | 11/2017 |

OTHER PUBLICATIONS

U.S. Appl. No. 15/598,718, filed May 18, 2017, David C. Winkle.
U.S. Appl. No. 15/611,487, filed Jun. 1, 2017, David C. Winkle.
U.S. Appl. No. 15/624,211, filed Jun. 15, 2017, Brian G. McHale.
U.S. Appl. No. 15/660,153, filed Jul. 26, 2017, David C. Winkle.
Aga; "Transportation Cooling"; http://www.aga.se/en/processes_ren/freezing_cooling/transportation_cooling/index.html; Available at least as early as Jan. 21, 2016; pp. 1-3.
Alexey Negrash; "Nano Liquid Ceramic Thermal Insulation Coating ( LCTIC ) Thermal Barrier Paint"; https://www.youtube.com/watch?v=X8F18IY9PmY; published on Jul. 16, 2013; pp. 1-6.
Fedex Express; "Packaging Perishable Shipments"; Retrieved on May 2015; pp. 1-8.
Krapfl, Mike; "Researcher working to save energy with nanotechnology insulation", Phys.org, http://phys.org/news/2014-12-energy-nanotechnology-insulation.html, Dec. 2, 2014, pp. 1-4.
Liu Jiang; "Wall thermal insulation nano-coating"; https://www.youtube.com/watch?v=yF4NnNTPITQ; published on Nov. 14, 2015; pp. 1-17.
PCT; App. No. PCT/US2017/033025 ; International Search Report and Written Opinion dated Aug. 16, 2017.
PCT; App. No. PCT/US2017/033236; International Search Report and Written Opinion dated Aug. 14, 2017.
PCT; App. No. PCT/US2017/033246; International Search Report and Written Opinion dated Aug. 23, 2017.
PCT; App. No. PCT/US2017/035631; International Search Report and Written Opinion dated Aug. 22, 2017.
PCT; App. No. PCT/US2017/037698; International Search Report and Written Opinion dated Sep. 1, 2017.
PCT; App. No. PCT/US2017/042769; International Search Report and Written Opinion dated Sep. 27, 2017.
PCT; App. No. PCT/US2017/054843; International Search Report and Written Opinion dated Dec. 18, 2017.
Prevenslik, T.; "QED Cooling of Structures by Nanoscale Coatings", Proceedings of the 5th International Conference on Nanostructures, Mar. 6-9, 2014, pp. 1-3.
Raman, Aaswath, et al.; "Photonic Radiative Cooling", 2015 Technology Application for Cleantech to Market (C2M), 2015, pp. 1-4.
SBC Magazine; "Spray 'Nano-Insulation' Applied to Windows During Energy Retrofit"; https://www.sbcmag.info/news/2016/oct/spray-nano-insulation-applied-windows-during-energy-retrofit; published on Oct. 17, 2016; pp. 1-5.
Stauth, David; "Nanotech yields major advance in heat transfer, cooling technologies", Oregon State University, http://oregonstate.edu/ua/ncs/archives/2010/jun/nanotech-yields-major-advance-heat-transfer-cooling-technologies, Jun. 9, 2010, pp. 1-3.
Wikipedia; "Pot-in-pot refrigerator"; https://web.archive.org/web/20150606152436/https://en.wikipedia.org/wiki/Pot-in-pot_refrigerator; Jun. 2015; pp. 1-2.
PCT; App. No. PCT/US2017/033016; International Search Report and Written Opinion dated Jan. 5, 2018.
U.S. Appl. No. 16/267,057, filed Feb. 4, 2019, Winkle David C.
U.S. Appl. No. 16/301,993, filed Nov. 15, 2018, David C. Winkle.
U.S. Appl. No. 16/301,999, filed Nov. 15, 2018, David C. Winkle.
U.S. Appl. No. 15/598,718; Office Action dated Oct. 11, 2018.
U.S. Appl. No. 15/598,699; Office Action dated Jan. 30, 2019.
U.S. Appl. No. 15/611,487; Office Action dated May 15, 2019.
U.S. Appl. No. 15/624,211; Office Action dated May 14, 2019.
U.S. Appl. No. 15/660,153; Notice of Allowance dated Nov. 5, 2018.
U.S. Appl. No. 15/660,153; Office Action dated Jun. 4, 2018.
Wikipedia; "Nanotechnology"; https://en.wikipedia.org/wiki/Nanotechnology; printed May 2019; pp. 1-19.

* cited by examiner

US 10,474,982 B2

SYSTEMS AND METHODS UTILIZING NANOTECHNOLOGY INSULATION MATERIALS IN LIMITING TEMPERATURE CHANGES DURING PRODUCT DELIVERY

CROSS-REFERENCE TO RELATED APPLICATION

This application claims the benefit of U.S. Application No. 62/403,909, filed Oct. 4, 2016, which is incorporated herein by reference in its entirety.

TECHNICAL FIELD

This invention relates generally to product temperature control systems.

BACKGROUND

In a modern retail environment, there is a need to improve the customer service and/or convenience for the customer. One aspect of customer service is the delivery of products. There are numerous ways to delivery products to customers. Getting the product to a delivery location, however, can adversely affect the product, can cause undesirable delays, can add cost and reduce revenue.

BRIEF DESCRIPTION OF THE DRAWINGS

Disclosed herein are embodiments of systems, apparatuses and methods pertaining to limiting temperature change of products during delivery. This description includes drawings, wherein.

Figure 1:
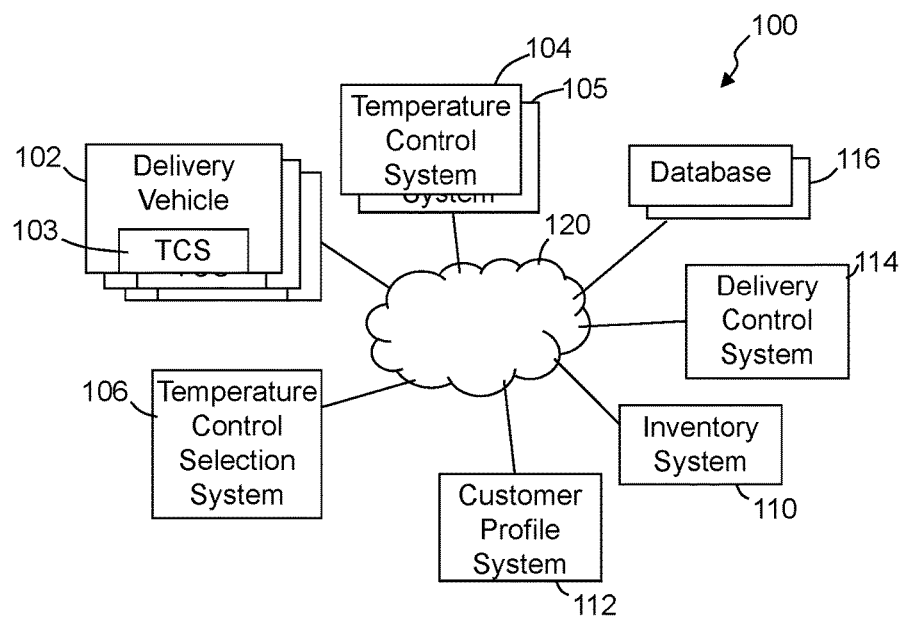
FIG. 1 illustrates a simplified block diagram of an exemplary product delivery coordinating system that is configured to schedule and coordinate the delivery of products while limiting temperature changes and/or maintaining temperatures of one or more products while transported to one or more delivery locations, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to limit changes in temperature of one or more products being transported to a delivery location. By limiting changes of temperatures, products can be kept below or above threshold temperatures, maintain a freshness of products, and other such benefits. Some embodiments include unmanned delivery vehicles (UDVs) that have a body comprising a nanotechnology insulation material. The nanotechnology insulation material includes a material that has been manipulated at a molecular level during the macroscale fabrication of the nanotechnology insulation material to enhance insulation effectiveness. The UDVs include at least one propulsion system configured to induce movement of the UDVs and a control circuit coupled with the propulsion systems to control the operation of the propulsion systems and control a direction of travel of the UDV. The body is configured to physically support the propulsion systems and the control circuit. Further, one or more product cavities are defined within the body and configured to receive at least one product and support the product while product is transported by the UDV to a delivery location.

FIG. 1 illustrates a simplified block diagram of an exemplary product delivery coordinating system 100 that is configured to schedule and coordinate the delivery of products while limiting temperature changes and/or maintaining temperatures of one or more products while transported to one or more delivery locations, in accordance with some embodiments. The system 100 includes multiple UDVs 102 that include at least one temperature control system 103 of multiple different types of temperature control systems 103-105 (e.g., product cooling systems and/or product heating systems). The system typically further includes a temperature control selection system 106. Some embodiments further include one or more inventory systems 110 associated with one or more product retail facilities, customer profile system 112, delivery control system 114, and one or more databases 116 (e.g., one or more customer databases, inventory databases, product databases, route parameter databases, etc.). One or more computer and/or communication networks 120 establish communication connections between two or more of the components of the system 100 and allow communications and/or data transmissions between two or more of the components of the system 100. In some embodiments, the delivery coordinating system 100 is associated with one or more retail facilities from which products can be purchased and/or that coordinates delivery of those products. The shopping facility may, in some instances, be a retail sales facility, a fulfillment center, a distribution center, or other type of facility in which products are sold and/or distributed to customers. The facility may be any size or format, and may include products from one or more merchants. For example, a facility may be a single store operated by one merchant, a chain of two or more stores operated by one entity, or may be a collection of stores covering multiple merchants.

The temperature control selection system 106 utilizes product parameters and delivery parameters in evaluating which product cooling system and/or delivery vehicle are to be employed in transporting one or more products to one or more delivery locations. Typically, the temperature control selection system identifies products that have one or more temperature thresholds that are to be maintained and/or not to be exceeded. For example, a product may have one or more of a desired storage threshold temperature, a desired transport temperature, a regulatory or government specified temperature threshold, other such temperature thresholds, and in some instances a combination of two or more temperature thresholds. Further, some of the temperature thresholds may correspond to time thresholds, where for a particular product it may be desired that the product be maintained below a first temperature threshold, but can exceed the first temperature for less than a threshold duration of time and typically while being maintained under a second temperature threshold. One or more databases may be accessed (e.g., product database, inventory database, regulatory database, etc.) to obtain information about one or more temperature thresholds and/or corresponding duration thresholds, transportation parameters, delivery parameters, customer preferences, and/or other such information, including relevant historic information.

Further, the temperature control selection system typically takes into consideration transportation parameters in selecting delivery vehicle 102 and/or a temperature control system 103-105 to be used in transporting one or more products. The transport parameters can include, but are not limited to, expected duration of transport and/or duration of exposure to non-temperature controlled environments (e.g., outside of a freezer or refrigerator), predicted and/or forecasted environmental conditions through which the product(s) is to be transported (e.g., temperatures, humidity, potential wind, precipitation, etc.), and other such information. The transportation parameters may be obtained based on historic data (e.g., historic weather and temperatures, historic traffic patterns, data obtained from similar previous deliveries, etc.) and forecasted data (e.g., forecasted weather, forecasted traffic, etc.), current data, and the like. Further, the transportation parameters may be obtained based on information collected by the retail store or chain of stores, and/or one or more third party sources (e.g., one or more weather services, traffic service, delivery service, etc.). Typically, the transportation parameters can further include and/or consider the time, temperature, mode of transport, type of delivery vehicle, and the like associated with the preparation and/or loading of the product into a cooling system and/or the delivery vehicle, the unloading of the delivery vehicle, and other such factors. The system may take other parameters into consideration including, but not limited to, product parameters (e.g., type of product, size of product, size of multiple products (e.g., sum of volumes and/or volume of strategically arranged products), weight, quantity, and the like), customer requests, types of delivery location, whether a temperature control system is available at the delivery location, whether a customer is expected to be available to receive the product(s) at the time of delivery, other such parameters, and often a combination of two or more of such parameters.

Figure 2:
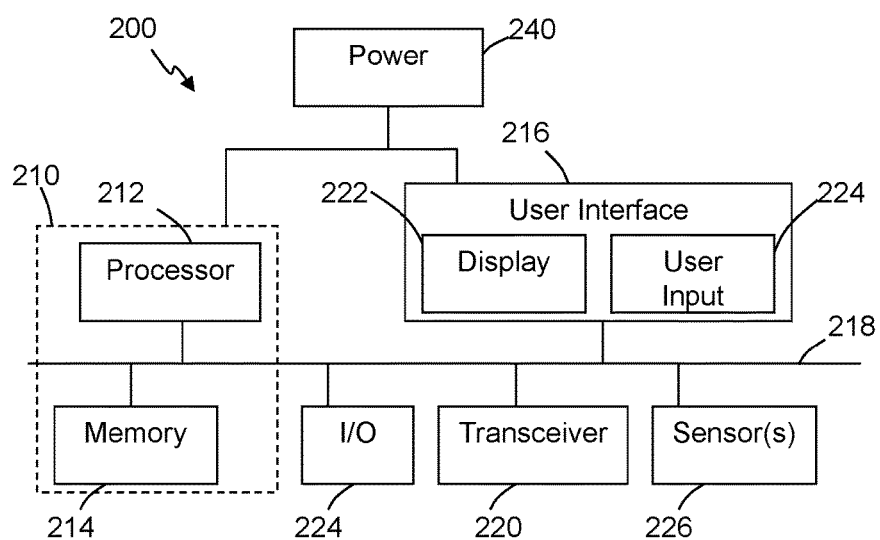
FIG. 2 illustrates a simplified block diagram of an exemplary system for use in implementing methods, techniques, devices, apparatuses, systems, servers, sources and the like in limiting temperature changes of a product during transit, in accordance with some embodiments.

The processes, methods, techniques, circuits, circuitry, systems, devices, functionality, services, servers, sources and the like described herein may be utilized, implemented and/or run on many different types of devices and/or systems. FIG. 2 illustrates an exemplary system 200 that may be used for implementing any of the components, circuits, circuitry, systems, functionality, apparatuses, process, or device of the system 100 of FIG. 1 and/or mentioned above or below, or parts of such circuit, circuitry, functionality, systems, apparatuses, processes, or devices. For example, the system 200 may be used to implement some or all of the temperature control systems 103-105, a temperature control selection system 106, delivery vehicles 102, inventory systems 110, customer profile system 112, delivery control system 114, and/or other such components, circuitry, functionality and/or devices. However, the use of the system 200 or any portion thereof is certainly not required.

By way of example, the system 200 may comprise a control circuit or processor module 212, memory 214, and one or more communication links, paths, buses or the like 218. Some embodiments may include one or more user interfaces 216, and/or one or more internal and/or external power sources or supplies 240. The control circuit 212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 212 can be part of control circuitry and/or a control system 210, which may be implemented through one or more processors with access to one or more memory 214 that can store code that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 200 may be used to implement one or more of the above or below, or parts of, components, circuits, systems, process and the like. For example, the system may implement the temperature control selection system 106 with the control circuit being a selection system control circuit, a delivery vehicle 102 with the control circuit being a vehicle control circuit, product cooling system with the control circuit being a cooling system control circuit, a product delivery control system with the control circuit being a product delivery control circuit, a temperature control system with a temperature control circuit, or other components.

The user interface 216 can allow a user to interact with the system 200 and receive information through the system. In some instances, the user interface 216 includes a display 222 and/or one or more user inputs 224, such as a buttons, touch screen, track ball, keyboard, mouse, etc., which can be part of or wired or wirelessly coupled with the system 200.

Typically, the system 200 further includes one or more communication interfaces, ports, transceivers 220 and the like allowing the system 200 to communicate over a communication bus, a distributed computer and/or communication network 120 (e.g., a local area network (LAN), the Internet, wide area network (WAN), etc.), communication link 218, other networks or communication channels with other devices and/or other such communications or combinations thereof. Further the transceiver 220 can be configured for wired, wireless, optical, fiber optical cable, satellite, or other such communication configurations or combinations of two or more of such communications.

The system 200 comprises an example of a control and/or processor-based system with the control circuit 212. Again, the control circuit 212 can be implemented through one or more processors, controllers, central processing units, logic, software and the like. Further, in some implementations the control circuit 212 may provide multiprocessor functionality.

The memory 214, which can be accessed by the control circuit 212, typically includes one or more processor readable and/or computer readable media accessed by at least the control circuit 212, and can include volatile and/or nonvolatile media, such as RAM, ROM, EEPROM, flash memory and/or other memory technology. Further, the memory 214 is shown as internal to the control system 210; however, the memory 214 can be internal, external or a combination of internal and external memory. Similarly, some or all of the memory 214 can be internal, external or a combination of internal and external memory of the control circuit 212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory. The memory 214 can store code, software, executables, scripts, data, content, lists, programming, programs, log or history data, user information and the like. While FIG. 2 illustrates the various components being coupled together via a bus, it is understood that the various components may actually be coupled to the control circuit and/or one or more other components directly.

Some embodiments include the I/O interface 234 that allows wired and/or wireless communication coupling of to external components, such as with one or more temperature control systems 103-105, temperature control selection system 106, delivery vehicles 102, inventory systems 110, customer profile system 112, delivery control system 114, databases 116, and other such devices or systems. Typically, the I/O interface provides wired communication (e.g., USB, Ethernet, and/or other such ports) and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some implementations, the system 200 includes one or more sensors 226 that can communicate sensor data to the control circuit 212 and/or other systems. The sensors can include one or more distance sensors (e.g., laser, sonar, etc.), location sensors (e.g., GPS, cellular triangulation, etc.), temperature sensors, humidity sensors, inertial sensors, wind speed sensors, acceleration sensors, velocity sensors, altitude sensors, weight sensors, power level sensors, other such sensors, or combination of two or more of such sensors. The sensors may communicate wired or wirelessly over the communication link 218, the distributed computer and/or communication network 120, or the like. Further, the sensors 226 are illustrated directly coupled with the control circuit 212 via the communication link 218; however, one or more sensors may be internal, external or a combination of internal and external, other networks or communication channels with other devices and/or other such communications or combinations thereof. For example, in some applications one or more temperature sensors may be positioned within a product cavity of a cooling system, adjacent to or as part of a product holder, incorporated into insulation, external to a housing of a cooling system, other such locations, or combination of two or more of such locations.

As described above, some embodiments include the temperature control selection system 106 that evaluates multiple parameters to select one or more product temperature control systems, from multiple different types of temperature control systems, to be used while delivering one or more products. The temperature control systems can comprise one or more insulated transport vehicles, nanotechnology insulation materials, evaporative temperature control systems (e.g., described in U.S. App. No. 62/338,224, filed May 18, 2016, entitled Evaporative Cooling Systems and Methods of Controlling Product Temperatures During Delivery, and U.S. application Ser. No. 15/598,699, filed May 18, 2017, which are incorporated herein by reference in their entirety) with an evaporative control system control circuit, cryogenic substance cooling systems (e.g., described in U.S. App. No. 62/338,231, filed May 18, 2016, entitled Cryogenic Cooling Systems and Methods of Controlling Product Temperatures During Delivery, incorporated herein by reference in its entirety, and International Application No. PCT/US2017/033236 filed May 18, 2017, incorporated herein by reference in its entirety) with a cryogenic cooling system control circuit, aerosol temperature control systems (e.g., described in U.S. App. No. 62/338,290, filed May 18, 2016, entitled Systems and Methods of Controlling Product Temperatures During Delivery, and U.S. application Ser. No. 15/598,718, filed May 18, 2017, which are incorporated herein by reference in their entirety) with an aerosol control system control circuit, temperature pack cooling systems (e.g., described in U.S. App. No. 62/338,246, filed May 18, 2016, entitled Temperature Pack Cooling Systems and Methods of Controlling Product Temperatures During Delivery, incorporated herein by reference in its entirety, and International Application No. PCT/US2017/033016 filed May 17, 2017, incorporated herein by reference in its entirety), cooling sustaining bag systems, heat pack temperature systems, other temperature control systems, or combination of two or more of such systems. For example, some embodiments consider the vehicle used to deliver the products and identify when mass can have a threshold effect on the delivery vehicle and/or efficiency of the delivery. This can include, for example, when considering aerial delivery where small differences in weight of the delivery vehicle can significantly affect a maximum travel distance, limiting weights of products that can be transported, limiting a rate of travel, and/or other such factors. Accordingly, the nanotechnology may be utilized to reduce weight of a vehicle while still providing a threshold insulation rating. Other temperature control systems may incorporated and/or used with the nanotechnology insulation such as those described in U.S. application Ser. No. 15/611,487 filed Jun. 1, 2017; U.S. application Ser. No. 15/660,153, filed Jul. 26, 2017; and U.S. application Ser. No. 15/624,211, filed Jun. 16, 2107, which are incorporated herein by reference in their entirety.

Figure 3:
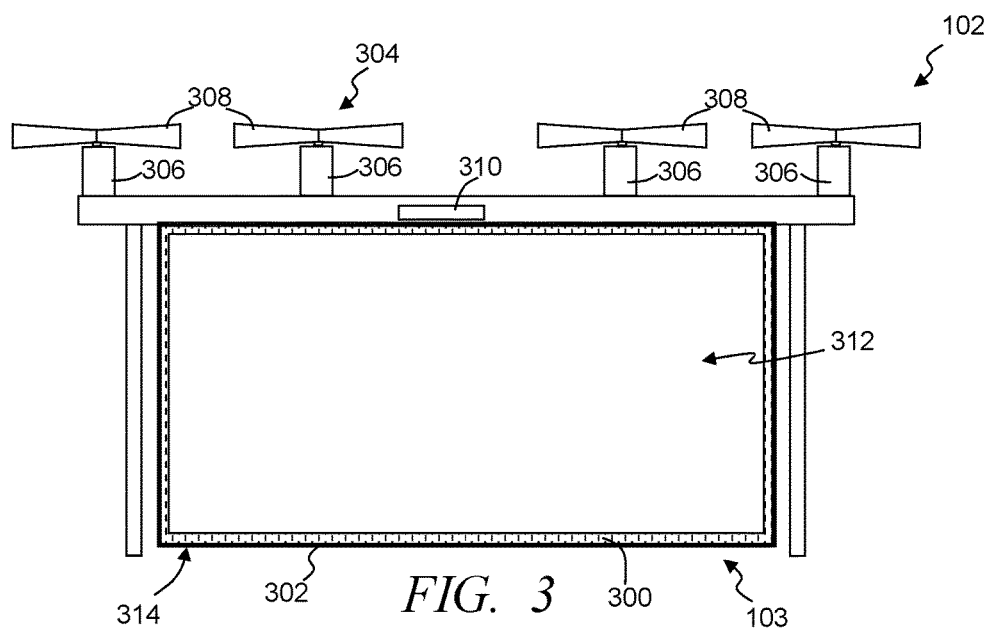
FIG. 3 illustrates a simplified block diagram, cross-sectional view of an exemplary unmanned delivery vehicle (UDV), in accordance with some embodiments.
Figure 4:
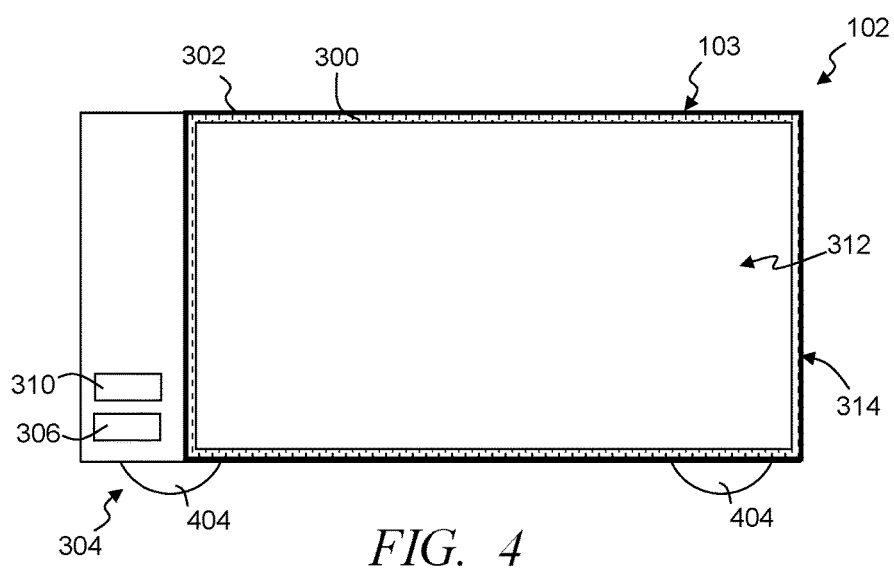
FIG. 4 illustrates a simplified block diagram, cross-sectional view of an exemplary UDV, in accordance with some embodiments.
Figure 5:
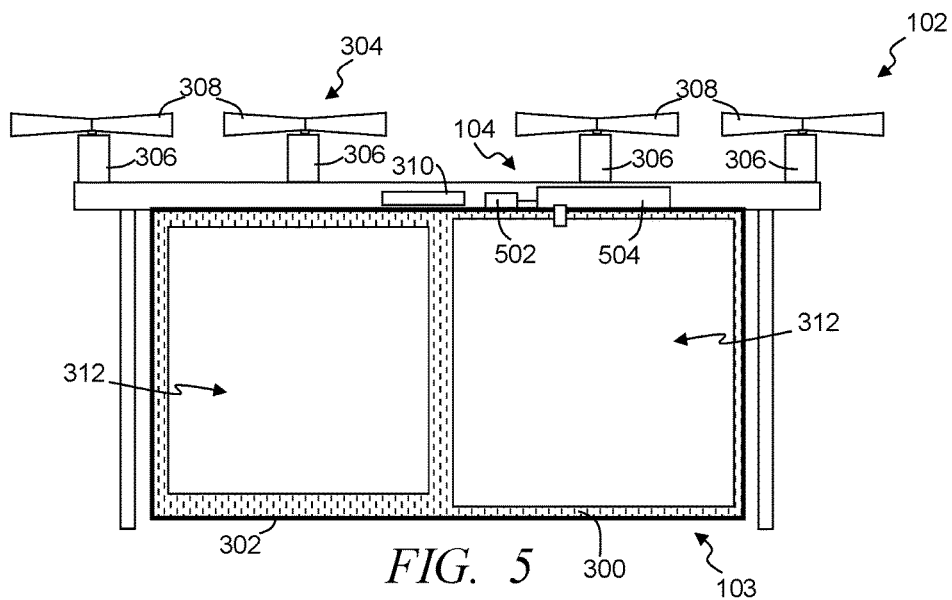
FIG. 5 illustrates a simplified block diagram, cross-sectional view of an exemplary UDV, in accordance with some embodiments.
Figure 6:
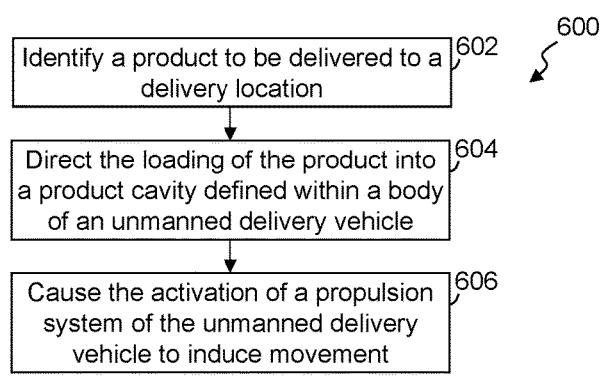
FIG. 6 illustrates a simplified flow diagram of an exemplary process of limiting temperature changes of one or more products during transit, in accordance with some embodiments.

FIG. 3 illustrates a simplified block diagram, cross-sectional view of an exemplary unmanned delivery vehicle (UDV) 102, in accordance with some embodiments. FIG. 4 illustrates a simplified block diagram, cross-sectional view of an exemplary unmanned delivery vehicle (UDV) 102, in accordance with some embodiments. Referring to FIGS. 3-4, the UDVs include a temperature control system 103 to limit temperature changes of a product during transit. The UDV has a body 302 that physically supports and/or cooperates with one or more propulsion systems 304 that induce movement of the unmanned delivery vehicle. In some embodiments, the propulsion system includes one or more motors 306 cooperated with a drive shaft to drive one or more propellers 308, wheels 404, tracks, treads, and/or other such methods of moving the UDV. The propulsion system permits the UDV to move along a specified route and/or maneuver around objects and areas. The UDV further includes at least one control circuit and/or system 310 that provides control over at least the propulsion system and the operation of the propulsion system controlling directions of travel of the UDV.

Typically, the body defines a fuselage, frame, shell and/or other structure of the UDV. In some embodiments, the UDV further includes one or more product cavities 312 defined within at least a portion of the body 302 and/or cooperated with the body. The UDV provides external access to the one or more product cavities through one or more doors, hatches, openings, latches, straps, bands, other such features, or combination of two or more of such features. The product cavity supports and/or receives one or more products while the one or more products are transported by a UDV to one or more delivery locations. Additionally or alternatively, one or more insulated product carriers, lockers or other such carriers may be removably coupled with the UDV and pulled, pushed, carried or otherwise transported by the UDV. For example, a separate product carrier may have wheels, a body and a product cavity defined within the body, a tow coupling that couples with a UDV, and nanotechnology insulation material positioned adjacent and/or around at least portions of the product cavity. In some implementations, the product cavity may further secure the one or more products within the product cavity through one or more locking systems, which may be manual, controlled by the control system 310, or combination thereof. An automated inventory system and/or workers can be directed to place one or more products into the product cavity and are retained in the product cavity while transported by the UDV to a delivery location.

In some embodiments the temperature cooling system included one or more nanotechnology insulation materials 300 that provide insulation while being light weight and/or needing less material than other types of insulation. The nanotechnology insulation material 300 comprises material that has been manipulated at a molecular level during the macroscale fabrication of the nanotechnology insulation material to enhance insulation effectiveness (e.g., nano-liquid ceramic thermal insulation coating, Nacube thermal insulation coating, Liquid Nanotint). In some embodiments, one or more the nanotechnology insulation materials are positioned around at least some and typically all of the product cavity 312 to provide an insulating layer between the product cavity and the exterior environment.

In some embodiments, the body 302 further comprises a shell 314, which may be a rigid exterior shell 314, a soft shell, a shell formed from the nanotechnology insulation material 300, and the like. The shell can provide additional protection for the product cavity, the products and/or the nanotechnology insulation material. Further, in some applications, the shell provides added stability to the body and UDV. In some embodiments, the shell is positioned adjacent to the nanotechnology insulation material and defines an exterior surface of at last part of the body, such as at least about some or all of the product cavity 312 such that the nanotechnology insulation material 300 is between the exterior shell and the product cavity.

The nanotechnology insulation material may be cooperated with the body 302 through one or more techniques, such as but not limited to poured into one or more cells as a liquid, placed or stuffed into one or more insulation cavities, stuck to the body and/or exterior of the product cavity through one or more adhesives, applied as a paint, forming a structural part of the body and/or product cavity, secured with one or more bolts, screws or other such fasteners, other such methods, or combinations of such methods. In some embodiments, at least some of one or more nanotechnology insulation materials 300 is applied to adhere to one or more interior surfaces of an exterior shell of the UDV. For example, in some implementations, the nanotechnology insulation material is applied to adhere to the interior surface of the exterior shell as one or more layers of nanotechnology insulation material, such as being painted onto the one or more interior surfaces of the exterior shell, poured onto one or more interior surfaces, dipping at least parts of the exterior shell, and/or other such methods. Further, the nanotechnology insulation material 300 may be used in cooperation with one or more other insulation materials (e.g., Styrofoam, wool, neoprene, polar-fleece, etc.).

In some embodiments, the body 302 is at least partially formed and/or constructed from one or more nanotechnology insulation materials. One or more of the nanotechnology insulation material may be a rigid material used to form walls of the body. In some instances, the walls may defining at least lateral boundaries of the product cavity. For example, some or all of the body surrounding the product cavity may be formed from one or more aerogels. The use of nanotechnology materials are often lighter, may be stronger, and can improve the efficiency of the UDV. Further, with some embodiments, the nanotechnology insulation material provides greater insulation than some other insulation materials allowing greater transport and/or storage times while providing the same limits on temperature change.

The use of the UDVs 102 can be dependent on one or more factors. In some embodiments, the temperature control selection system 106 obtains one or more temperature thresholds of one or more products to be delivered, and obtains transport parameters, such as but not limited to a predicted duration of transport. The temperature control selection system can be configured to identify a method of transporting the one or more product to one or more delivery location, such as through a ground based unmanned delivery vehicle, an aerial unmanned delivery vehicle, a delivery truck or van driven by a delivery worker, other such method, or combination of such methods. Further, the temperature control selection system can select from multiple different types of temperature control systems the UDV that is consistent with the method of transport and as a function of the temperature threshold, the predicted duration of transport and an insulation factor provided by the nanotechnology insulation material. In some applications, the insulation factor is defined as a function of a rate of change of temperature over time of a known item while within a product cavity formed of a known quantity of the nanotechnology insulation material and while exposed to a known exterior temperature. For example, the UDV may comprise an unmanned aircraft system (UAS) with the body 302 forming a part of a fuselage of the UAS, with the UAS being configured to secure and lift at least one product positioned within the product cavity 312 while the UAS transports the product by air to a delivery location. The weight of the UDV and/or UAS can affect the travel duration, and the selection system can take into consideration the duration of travel and the reduced weight provided by at least some nanotechnology insulation materials.

Some embodiments utilize multiple temperature control systems 103-105, which may be used sequentially, simultaneously, cooperatively, or other combination. For example, in some embodiments, a primary active temperature control system. The primary temperature control system may be the nanotechnology insulation material, or a different temperature control system (e.g., evaporative temperature control systems, cryogenic substance cooling systems, aerosol temperature control systems, temperature pack cooling systems, cooling sustaining bag systems, heat pack temperature systems, etc.). In some instances, the primary temperature control system may be an active temperature control system that is activated to at least limit temperature change. For example, activate temperature control system can include a temperature control circuit and a reservoir of coolant (e.g., evaporative coolant, aerosol coolant, cryogenic coolant, or other such coolant). Some embodiments additionally or alternatively take advantage of ambient conditions to implement evaporative cooling and/or enhance the evaporative cooling. In some instances, a UAS delivery vehicle may fly through a cloud that deposits moisture on at least an exterior wall. This exterior moisture evaporates which may be utilized to enhance the cooling and/or limit a change in temperature within an evaporative cavity and/or product cavity. The continued flight of the UAS delivery vehicle can be controlled to further adjust a rate of evaporation of the moisture that adheres to the exterior walls. For example, the temperature control circuit can receive temperature sensor data and detect a change in temperature of the exterior wall and/or a change in the rate of change of temperature within the evaporative cavity to identify an evaporative effect on the exterior wall. Additionally or alternatively, one or more moisture sensors may be positioned to detect exterior moisture. The rate of evaporation of the exterior moisture in part can be controlled based on a speed of the UAS delivery vehicle, an orientation of the product cooling system while being transported, rate of injection of evaporative coolant within an evaporative cavity, and the like. Further, in some embodiments, the temperature control circuit may receive an indication of exterior moisture and cause a change in orientation of the product cooling system while the exterior moisture is present to enhance a distribution of the exterior moisture across a larger area of the exterior wall and/or all of the exterior wall. Similarly, one or more evaporative openings may be adjusted to reduce evaporation from an evaporative cavity as a result of the exterior moisture and expected enhanced exterior evaporation. In some implementations, the UAS delivery vehicle may be routed with attempts to interact with clouds, fog or other conditions to take advantage of exterior moisture and evaporative effects, which can save evaporative coolant, battery power, and the like. For example, it may be identified through one or more remote sensors and/or weather data that clouds are present at a determined altitude, and the UAS delivery vehicle can be directed by the temperature control circuit and/or a central system to fly at an altitude that is expected to allow the product cooling system to interact with the exterior moisture. The temperature control circuit and/or a central system can evaluate current conditions relative to historic conditions in identifying when it is expected that sufficient external moisture sources are to be available along a delivery route. Further, in some implementations the delivery route may be modified to allow the product cooling system to interact with expected exterior moisture sources.

FIG. 5 illustrates a simplified block diagram, cross-sectional view of an exemplary UDV 102, in accordance with some embodiments, and having an exemplary primary temperature control system 104, and exemplary nanotechnology insulation material 300. The primary temperature control system 104 can include a temperature control circuit 502 configured to limit temperature change within the product cavity 3 through a controlled release from a reservoir 504 of a coolant based on one or more temperature thresholds of at least one product being carried within the product cavity 312. The nanotechnology insulation material 300 comprises a secondary temperature control system distinct from the primary active temperature control system. As described above, in some embodiments, the nanotechnology insulation material is positioned adjacent one or more portions of the product cavity, and in some implementations is between the product cavity and an exterior shell 314. An interior shell may further be included that separates the nanotechnology insulation material from the product cavity, moisture and the products within the cavity. In some applications, the UDV is configured without a bottom such that the product while secured within the product cavity acts as at least part of a bottom (or top, or side, or other part) of the UDV.

FIG. 6 illustrates a simplified flow diagram of an exemplary process 600 of limiting temperature changes of one or more products during transit, in accordance with some embodiments. in step 602, a first product to be delivered to a delivery location is identified. In some embodiments, the delivery control system 114 schedules a delivery based on an order received from a customer (e.g., through an Internet purchase, through a shopping facility, a kiosk, mail order, or other such order). The delivery control system may access customer profiles maintained by the customer profile system to obtain payment, determine a delivery location or the like. Further, the delivery control system may communicate with the inventory system to confirm the availability of the ordered product, reserve the product, directly the routing of the product through a distribution center, fulfillment center or shopping facility to a staging area to be loaded into a delivery vehicle, such as a UDV, delivery van, delivery truck, or the like. As such, in step 604, a loading of the product into a product cavity 312 defined within a body of a UDV 102 is directed. The body can comprise a nanotechnology insulation material 300, comprising material having been manipulated at a molecular level during the macroscale fabrication of the nanotechnology insulation material to enhance insulation effectiveness.

In step 606, some embodiments cause the activation of at least one propulsion system of a delivery vehicle (e.g., UDV) to induce movement of the UDV with a control circuit controlling the operation of the one or more propulsion systems and a direction of travel of the UDV. In some embodiments, the UDV control system 310 receives instructions from the delivery control system and/or a transport vehicle to deliver the one or more products. The instructions can include an activation signal, a time when to activate, a delivery route that the UDV is to follow, a pickup location, delivery instructions, and/or other relevant information. Some of these instructions may additionally or alternatively be received while the UDV is in transit.

Some embodiments direct the loading of a product into the product cavity of the body comprising a rigid exterior shell positioned adjacent to the nanotechnology insulation material 300 and defining an exterior surface of the body at least about the product cavity such that the nanotechnology insulation material is between the exterior shell and the product cavity and the product. In some implementations, at least some of the nanotechnology insulation material is applied to adhere to one or more interior surfaces of the exterior shell. For example, the nanotechnology insulation material may be applied to adhere to the interior surface of the exterior shell as one or more layers of nanotechnology insulation material. In some instances, the nanotechnology insulation material can be painted onto the one or more interior surfaces of the exterior shell.

In directing the loading, some embodiments direct the loading of a product into the product cavity of the UDV having the body constructed from the nanotechnology insulation material. This nanotechnology insulation material may comprise a rigid material forming walls of the body defining at least lateral boundaries of the product cavity.

Some embodiments obtain a temperature threshold of a product to be delivered, and obtain one or more transportation parameters, delivery parameters, route parameters, customer preferences, product parameters, other such parameters, or combination of such parameters, such as a predicted duration of transport. A method of transporting the product to the delivery location can be identified. A UDV can be selected from multiple different types of temperature control systems that is consistent with the method of transport and as a function of the temperature threshold, the predicted duration of transport and an insulation factor provided by the nanotechnology insulation material. The selection of the UDV can take into consideration a quantity, thickness, density, and other factors of the nanotechnology insulation material. Further, some embodiments identify a desired thickness of the nanotechnology insulation material based in part on one or more temperature thresholds of the product being transported, the insulation factor, or other factors, and typically a combination of two or more of such factors. Based on the desired thickness a UDV can be selected having at least that thickness, while in other implementations, the system can instruct one or more layers of nanotechnology insulation material (e.g., formed in sheets with one or more know dimensions and thickness) to be inserted into the insulation cavity adjacent one or more portions of the product cavity and/or surrounding the product cavity. In other embodiments, the system may instruction one or more layers of nanotechnology insulation material be added to an exterior of the body. In selecting the UDV, some embodiments select an unmanned aircraft system (UAS) with the body forming a part of a fuselage of the UAS with the UAS configured to secure and lift at least one product positioned within the product cavity while the UAS transports the product by air to the delivery location. Further, some embodiments activate a primary active temperature control system limiting temperature change within the product cavity, controlling a release of coolant from a reservoir of the primary active temperature control system based on a temperature threshold of a product being carried within the product cavity. One or more nanotechnology insulation materials can comprise a secondary temperature control system distinct from the primary active temperature control system.

Some embodiments additionally or alternatively apply a nanotechnology insulation material directly to packaging of a product and/or onto a product carrier (e.g., a bag in which the product is placed, prior to putting the product into the product cavity and/or being positioned for transport by a delivery vehicle. In some instances, the nanotechnology insulation material is at least partially transparent and in some applications transparent to allow a person to view the product through the nanotechnology insulation material applied directly to the packaging and/or a product carrier.

In some embodiments, systems, apparatuses, methods and processes are provided to limit temperature changes of a product during delivery. Some embodiments provide systems comprising an unmanned delivery vehicle comprising: a body comprising a nanotechnology insulation material, wherein the nanotechnology insulation material comprises material having been manipulated at a molecular level during the macroscale fabrication of the nanotechnology insulation material to enhance insulation effectiveness; at least one propulsion system configured to induce movement of the unmanned delivery vehicle; a control circuit coupled with the at least one propulsion system to control the operation of the at least one propulsion system and control a direction of travel of the unmanned delivery vehicle, wherein the body physically supports the propulsion system and the control circuit; and a product cavity defined within the body and configured to receive at least one product while the at least one product is transported by the unmanned delivery vehicle to a delivery location.

Further, some embodiments provide methods of limiting temperature changes of a product during transit. Some of these methods comprise: identifying a first product to be delivered to a delivery location; directing a loading of the first product into a product cavity defined within a body of an unmanned delivery vehicle, wherein the body comprises a nanotechnology insulation material, wherein the nanotechnology material comprises material having been manipulated at a molecular level during the macroscale fabrication of the nanotechnology insulation material to enhance insulation effectiveness; and causing the activation of at least one propulsion system, which is physically supported by the body, of the unmanned delivery vehicle to induce movement of the unmanned delivery vehicle with a control circuit controlling the operation of the at least one propulsion system and a direction of travel of the unmanned delivery vehicle.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to limit temperature changes of a product during transit, comprising:

an unmanned delivery vehicle comprising:

a body comprising a nanotechnology insulation material, wherein the nanotechnology insulation material comprises material having been manipulated at a molecular level during a macroscale fabrication of the nanotechnology insulation material to enhance insulation effectiveness;

at least one propulsion system configured to induce movement of the unmanned delivery vehicle;

a control circuit coupled with the at least one propulsion system to control an operation of the at least one propulsion system and control a direction of travel of the unmanned delivery vehicle, wherein the body physically supports the propulsion system and the control circuit;

a product cavity defined within the body and configured to receive at least one product while the at least one product is transported by the unmanned delivery vehicle to a delivery location; and a primary active temperature control system comprising a temperature control circuit and a reservoir of coolant, wherein the temperature control circuit limits temperature change within the product cavity through a controlled release from the reservoir of the coolant based on a temperature threshold of a first product being carried within the product cavity;

wherein the nanotechnology insulation material comprises a secondary temperature control system distinct from the primary active temperature control system.

2. The system of claim 1, wherein the body further comprises a rigid exterior shell positioned adjacent to the nanotechnology insulation material and defining an exterior surface of the body at least about the product cavity such that the nanotechnology insulation material is between the exterior shell and the product cavity.

3. The system of claim 2, wherein at least some of the nanotechnology insulation material is applied to adhere to one or more interior surfaces of the exterior shell.

4. The system of claim 3, wherein the nanotechnology insulation material applied to adhere to the interior surface of the exterior shell comprises one or more layers of nanotechnology insulation material painted onto the one or more interior surfaces of the exterior shell.

5. The system of claim 1, wherein the body is constructed from the nanotechnology insulation material wherein the nanotechnology material comprises a rigid material forming walls of the body defining at least lateral boundaries of the product cavity.

6. The system of claim 1, further comprising:

a temperature control selection system configured to obtain the temperature threshold of the first product to be delivered, obtain a predicted duration of transport, identify a method of transporting the first product to the delivery location, and select from multiple different types of temperature control systems the unmanned delivery vehicle that is consistent with the method of transport and as a function of the temperature threshold, the predicted duration of transport and an insulation factor provided by the nanotechnology insulation material.

7. The system of claim 6, wherein the unmanned delivery vehicle comprises an unmanned aircraft system (UAS) with the body forming a part of a fuselage of the UAS, wherein the UAS is configured to secure and lift at least one product positioned within the product cavity while the UAS transports the first product by air to the delivery location.

8. A method of limiting temperature changes of a product during transit, comprising:

identifying a first product to be delivered to a delivery location;

directing a loading of the first product into a product cavity defined within a body of an unmanned delivery vehicle, wherein the body comprises a nanotechnology insulation material, wherein the nanotechnology material comprises material having been manipulated at a molecular level during a macroscale fabrication of the nanotechnology insulation material to enhance insulation effectiveness;

causing the activation of at least one propulsion system, which is physically supported by the body, of the unmanned delivery vehicle to induce movement of the unmanned delivery vehicle with a control circuit controlling an operation of the at least one propulsion system and a direction of travel of the unmanned delivery vehicle;

activating a primary active temperature control system limiting temperature change within the product cavity; and controlling a release of coolant from a reservoir of the primary active temperature control system based on a temperature threshold of the first product being carried within the product cavity;

wherein the nanotechnology insulation material comprises a secondary temperature control system distinct from the primary active temperature control system.

9. The method of claim 8, wherein the directing the loading of the first product comprises directing the loading of the first product into the product cavity of the body comprising a rigid exterior shell positioned adjacent to the nanotechnology insulation material and defining an exterior surface of the body at least about the product cavity such that the nanotechnology insulation material is between the exterior shell and the product cavity.

10. The method of claim 9, wherein at least some of the nanotechnology insulation material is applied to adhere to one or more interior surfaces of the exterior shell.

11. The method of claim 10, wherein the nanotechnology insulation material applied to adhere to the interior surface of the exterior shell comprises one or more layers of nanotechnology insulation material painted onto the one or more interior surfaces of the exterior shell.

12. The method of claim 8, wherein the directing the loading of the first product comprises directing the loading of the first product into the product cavity of the unmanned delivery vehicle having the body constructed from the nanotechnology insulation material comprising a rigid material forming walls of the body defining at least lateral boundaries of the product cavity.

13. The method of claim 8, further comprising:

obtaining the temperature threshold of the first product to be delivered;

obtaining a predicted duration of transport;

identifying a method of transporting the first product to the delivery location; and selecting from multiple different types of temperature control systems the unmanned delivery vehicle that is consistent with the method of transport and as a function of the temperature threshold, the predicted duration of transport and an insulation factor provided by the nanotechnology insulation material.

14. The method of claim 13, wherein the selecting the unmanned delivery vehicle comprises selecting an unmanned aircraft system (UAS) with the body forming a part of a fuselage of the UAS, wherein the UAS is configured to secure and lift at least one product positioned within the product cavity while the UAS transports the first product by air to the delivery location.

* * * * *